(12) United States Patent
Kasiolas et al.

(10) Patent No.: US 7,363,449 B2
(45) Date of Patent: Apr. 22, 2008

(54) SOFTWARE AGENT-BASED ARCHITECTURE FOR DATA RELOCATION

(75) Inventors: Anastasios Kasiolas, San Mateo, CA (US); Ronald H. Jones, Jr., Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 11/244,702

(22) Filed: Oct. 6, 2005

(65) Prior Publication Data

US 2007/0083725 A1 Apr. 12, 2007

(51) Int. Cl.
*G06F 13/00* (2006.01)
(52) U.S. Cl. ............................... 711/165; 711/162
(58) Field of Classification Search ............... None
See application file for complete search history.

(56) References Cited

U.S. PATENT DOCUMENTS

| | | | | |
|---|---|---|---|---|
| 6,253,295 | B1* | 6/2001 | Beal et al. .................. 711/162 |
| 6,922,757 | B2* | 7/2005 | Frank et al. ................ 711/147 |
| 7,120,769 | B2* | 10/2006 | Yagawa et al. ............. 711/162 |
| 7,139,885 | B2* | 11/2006 | Yamagami .................. 711/162 |
| 7,167,960 | B2* | 1/2007 | Kodama et al. ............ 711/162 |
| 2003/0101160 | A1* | 5/2003 | Seetharaman et al. ......... 707/1 |
| 2003/0126388 | A1* | 7/2003 | Yamagami .................. 711/162 |
| 2003/0159006 | A1* | 8/2003 | Frank et al. ................ 711/147 |
| 2004/0006587 | A1* | 1/2004 | McConnell et al. ........ 709/202 |
| 2004/0098490 | A1* | 5/2004 | Dinker et al. .............. 709/229 |
| 2004/0250034 | A1* | 12/2004 | Yagawa et al. ............. 711/162 |
| 2005/0015547 | A1* | 1/2005 | Yokohata et al. ........... 711/114 |
| 2005/0198455 | A1* | 9/2005 | Yagawa et al. ............. 711/162 |
| 2006/0059226 | A1* | 3/2006 | McConnell et al. ........ 709/202 |
| 2006/0123212 | A1* | 6/2006 | Yagawa ...................... 711/162 |
| 2006/0288178 | A1* | 12/2006 | Yagawa et al. ............. 711/162 |

* cited by examiner

*Primary Examiner*—Kevin Verbrugge
(74) *Attorney, Agent, or Firm*—Vierra Magen Marcus & DeNiro LLP

(57) ABSTRACT

Data is relocated among data storage nodes in a data center by using distributed agents. An agent at a first data storage node manages the relocation of associated data to a second data storage node, as well as the relocation of a mirror copy of the data at a third data storage node to a fourth data storage node, by receiving status information, such as via a publish-subscribe technique. The first agent may provide an identifier with a relocation request to the third data storage node which is relayed to the fourth data storage node, and used in status messages provided by the third and fourth data storage nodes. The received status information is then associated with the relocation request. Agents for each pair of sending and receiving data storage nodes can monitor their availability for servicing the relocation to negotiate an acceptable transmission rate.

20 Claims, 7 Drawing Sheets

SOFTWARE AGENT-BASED ARCHITECTURE FOR DATA RELOCATION

BACKGROUND

Data centers include data storage nodes for storing data. For example, a data center for a web-based application such as email may employ a number of data storage nodes that are geographically distributed. Each location may include a number of storage servers for storing data relating to users' email accounts, such as the text of emails, preferences for displaying emails and so forth. In such large, geographically distributed data centers, or even at a single location, there is often the need to relocate all, or a subset, of data of one node to another node, e.g., due to maintenance, hardware failures, decommissioning of old hardware, resource balancing, or simply a business decision.

Generally, existing approaches to data relocation are centrally driven and manually labor intensive. Typically, a separate dedicated server is used to manage the data relocation, and human operators have to get involved to achieve the desired results. Such approaches are not scalable, do not move the data in an optimum way, are hard to monitor, and are difficult to automate. There is no standardized way in the industry to address these issues. Instead, companies and other organizations that have data centers are addressing these issues with ad hoc solutions and architectures.

SUMMARY

The technology herein, roughly described, provides a technique for relocating data among storage nodes in a data center by using distributed agents at the storage nodes.

An architecture is provided for a data center in which data is stored in one or more clusters of data storage nodes. The clusters can be geographically remote from one another, for instance. Data can be relocated between data storage nodes within a cluster or in different clusters. The relocated data can be associated with user accounts, such as in a web-based application. In a particular approach, agents are provided at the different data storage nodes for providing a distributed relocation service. In response to data exchange requests from an administrator or external software, one of the agents begins relocating its associated data by setting up a peer-to-peer data transmission pathway to a receiving agent, such as by accessing cluster topology information stored in persistent storage at the cluster. The agent manages the relocation by receiving status information from the receiving agent. The status information may be provided to the managing agent via a publish-subscribe technique, and may include, but is not limited to, information such as the start and stop times of a relocation, and whether the relocation was successful. Furthermore, the managing agent may provide an identifier to the receiving agent for use in its status messages so that the messages can be identified when they are received by the managing agent. In another aspect, all of the data associated with a user's account, such as an email account, can be relocated over a single connection between the sending and receiving storage nodes.

The managing agent can also instruct other agents to begin relocating their associated data, and manage this data relocation by receiving status information from the involved sending and receiving agents. For example, the managing agent may relocate a primary copy of data from one or more user accounts, and instruct the other agents to relocate one or more mirror copies of the data. Additionally, agents for the sending and receiving data storage nodes can monitor their availability for servicing a relocation to set a mutually agreeable transmission rate which does not unduly impact other activities of the data storage nodes.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

A data center architecture is provided which is designed to facilitate data exchange in an automated and reliable manner. The data center can be organized as a set of clusters and the topology of each cluster can be located in some form of persistent storage, locally within the cluster. The topology information can contain IP addresses of the data storage nodes within each cluster. Moreover, a software agent is assigned to each node in the cluster and an administrator sends data exchange requests to a source node. The software agent for the source node then sets up a peer to peer data transmission pathway to a destination node's software agent. The two agents can then negotiate timing, transmission rate, and other particulars about the data transfer to ensure the transfer does not unduly affect performance of the source or destination nodes. Furthermore, the software agent for the source node can arrange and monitor data exchanges of one or more mirror copies of the data between one or more pairs of secondary source and destination storage nodes.

The solution provided is reliable, manageable, efficient, and scalable. Reliable means that no data gets lost during the transfer even if the underlying hardware is unreliable. However, in a distributed system things can go wrong. In one approach, the proposed solution guarantees that the relocation operation is atomic, which means the data is moved as a unit. Thus, the data is either successfully moved to a new location or not. If the relocation operation fails, then the data can still be accessed from its original location. Manageable means that operators or administrators can monitor the progress of the operation, and can perform a set of administrative actions such as canceling relocations and submitting relocation requests. Management can be performed from one location without having to interactively connect to the individual data storage nodes that are participating in a relocation operation. Efficient means that the relocation operation is as fast as possible to minimize user impact due to the fact that data may be temporarily unavailable during the move. Scalable means that the solution can scale over thousands of machines for petabytes of data. Moreover, since relocation operations can occur in parallel between data storage nodes at any given time while the data center is, at the same time, operating in its regular mode, it is desirable to guarantee that the performance of the data center is not unduly affected by the relocation operation that is taking place in the background.

Figure 1:
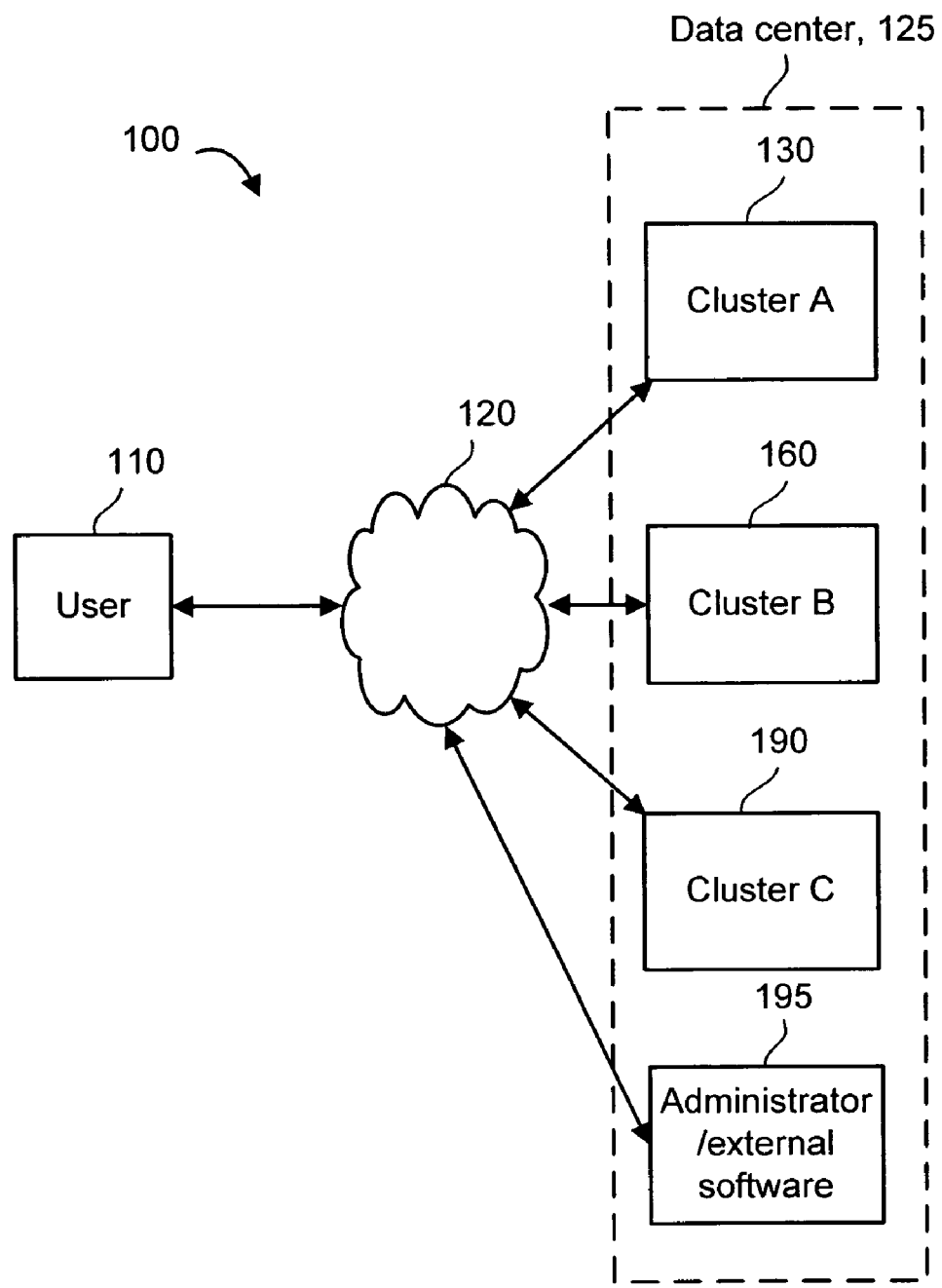
FIG. 1 illustrates a topology in which clusters of a data center store data for users.

FIG. 1 illustrates a topology $|_{[AK1]}$ in which a data center stores data for users. The network, shown generally at 100, includes an example user computer 110 which can communicate via a network cloud 120 with one or more clusters of a data center 125, such as clusters 130, 160 and 190, each of which includes one or more data storage nodes. For example, a data storage node may include a server with disks for storing data. The network cloud 120 may represent the Internet or other wide area network, a local area network, or any other type of network. An administrator/external software function 195 may be used to provide commands to a cluster. The function 195 may include a workstation with a user interface display that allows a human operator to manually provide commands to components in a cluster and view related information. External software, such as an external managing agent, can be used to automatically generate a request to relocate data. In either case, interactive tools may be used to issue, monitor, manage, and extract information about the current state of relocation operations.

In one possible example, the user computer 110 runs a web browser application for accessing the Internet via an Internet Service Provider, not shown. The clusters 130, 160 and 190, may store data for enabling an application such as email. Typically, the user establishes an account and indicates various preferences regarding the display of the email, how email messages should be handled when received or sent, and so forth. The user may also enter commands for joining distribution lists, uploading digital photos or video to share with friends, and perform various other tasks which require data to be stored. The data of a given account is $|_{[AK2]}$ stored at one location or cluster of a data center so that it can be readily accessed and updated, e.g., when the user accesses the account such as by sending or receiving an email. In the example provided, the data center 125 is distributed in that the clusters 130, 160 and 190 can be geographically remote from one another. However, this is not required. By organizing the data center in clusters, the system can scale to larger numbers of clusters in a predictable way.

Figure 2:
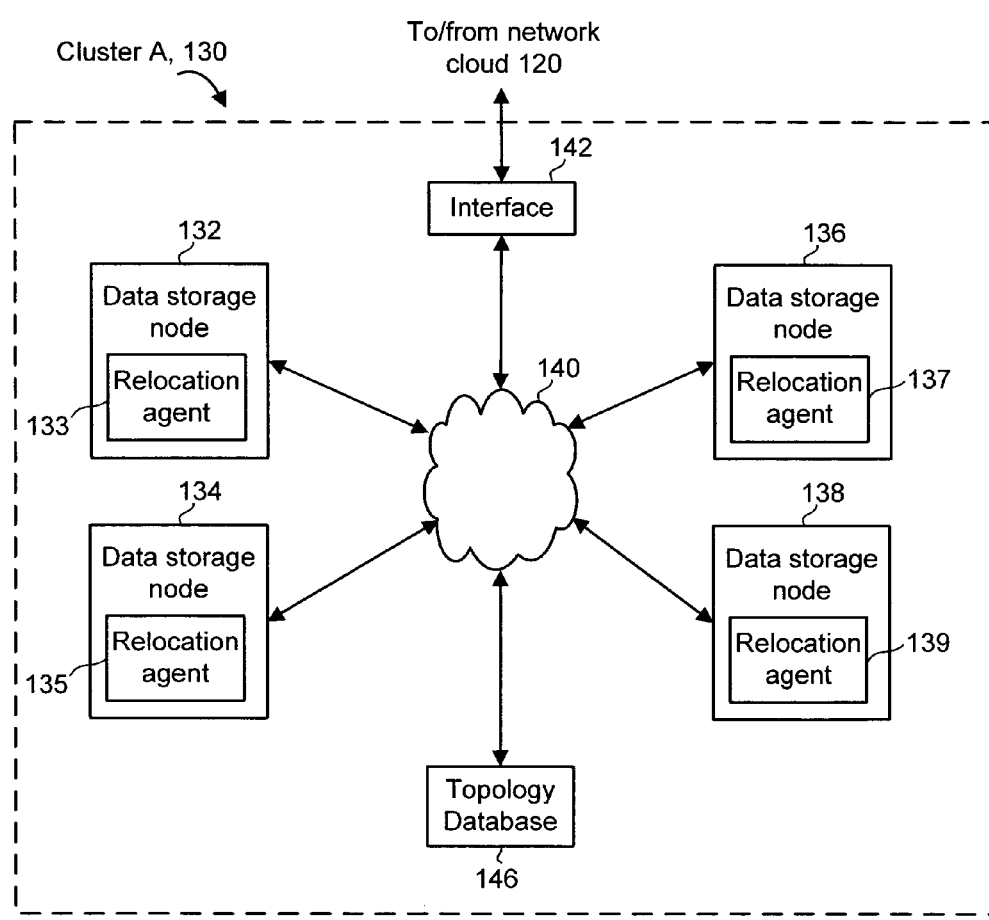
FIG. 2 illustrates a configuration of a cluster of a data center.

FIG. 2 illustrates a configuration of a cluster of a data center. The example cluster 130 includes a number of data storage nodes such as servers, specifically, data storage nodes 132, 134, 136 and 138. Each data storage node includes respective relocation agent software 133, 135, 137 or 139 which enables data to be relocated. The multiple software agents that are deployed across a cluster and/or different clusters of a data center can be activated to facilitate simultaneous distributed relocation operations. Each software agent can access the topology database of any cluster, and can connect to another agent of the same or a different cluster. Two agents can communicate with each other directly and exchange data in a peer-to-peer fashion. Further information regarding an example computer configuration which can be used for the administrator/external software function 195 and the data storage devices 132, 134, 136 and 138 is provided in FIG. 8, discussed further below.

A topology database 146 may be used to store data identifying network addresses, such as IP addresses, of different data storage nodes in the cluster 130 and/or in different clusters of the data center. The network addresses may alternatively be stored in a configuration file or lookup table. Each data storage node may have its own external network address such as an IP address, or a local network address which is translated to an external network address using a network address translator. A network interface 142 provides communication between the cluster A (130) and the network cloud 120 generally to allow communication with other clusters, users and so forth. Optionally, each data storage node has an associated external network interface. A network cloud 140 may represent a local area network, for instance, which enables the different components in the cluster 130 to communicate with one another. Furthermore, a firewall may be implemented using techniques known to those skilled in the art to prevent unauthorized access to the cluster 130 and to the data center generally. The use of packet filtering, application gateways, circuit-level gateways, and proxy servers, for instance, can be effective in providing a desired level of security.

Figure 3:
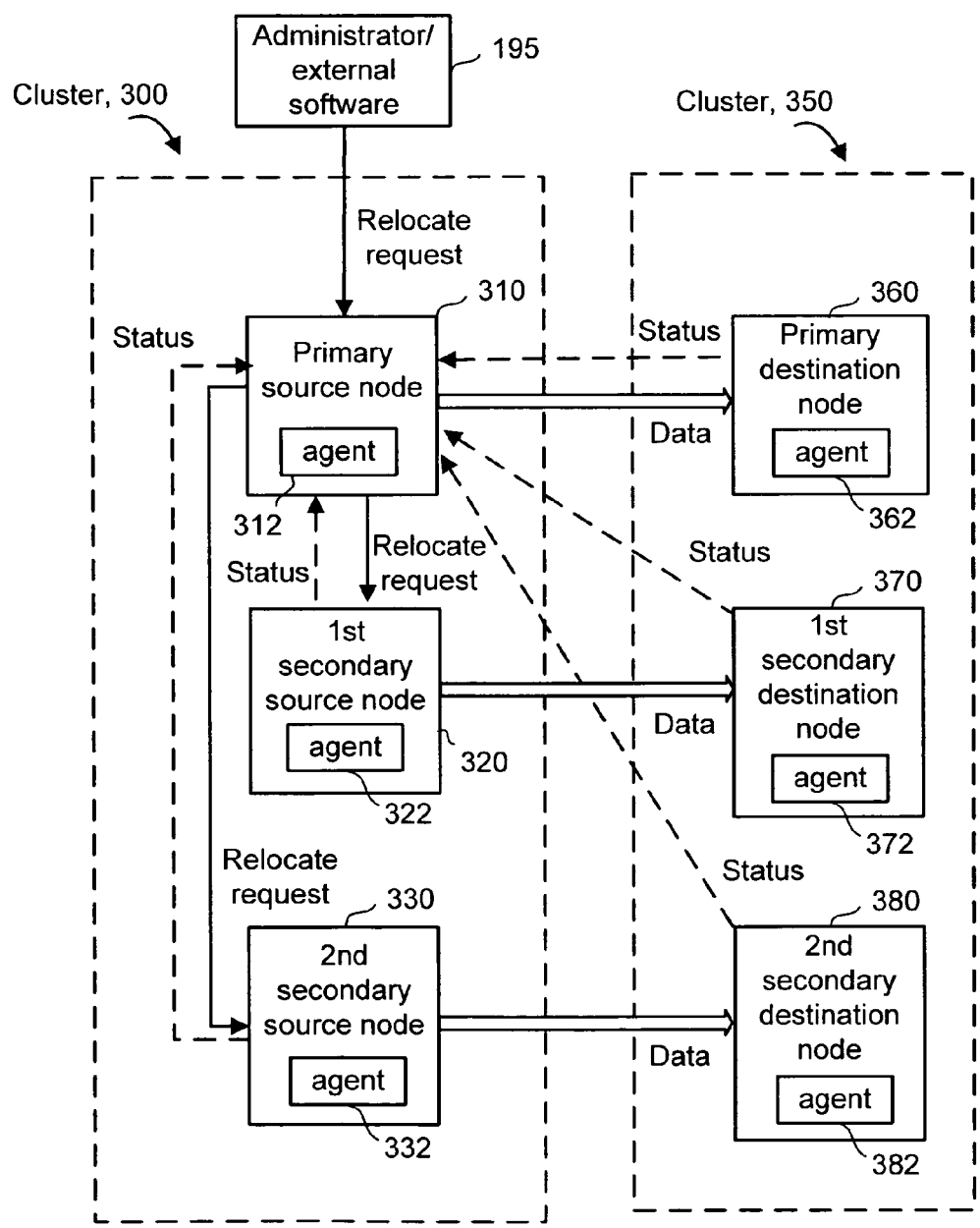
FIG. 3 illustrates relocation of a primary copy of data and one or more mirror copies between data storage nodes in different clusters.

FIG. 3 illustrates relocation of a primary copy of data and one or more mirror copies of the data. Data stored on a data storage node can be mirrored or replicated to one or more additional data storage nodes, generally at the same cluster, so that a secondary copy of the data will be available if the primary copy becomes unavailable due to a hardware failure or the like. In the example provided, there are two additional or secondary data storage nodes. Generally, the concepts discussed are applicable to any number of additional data storage nodes and/or mirror copies. Typically, the secondary copy is a mirror or replica copy of the primary copy that is updated when the primary copy is updated. Relocating the data associated with the account of a given user, for instance, therefore may involve not only relocating the primary copy of the data, but also relocating the one or more mirror copies. As mentioned, there is often a need to relocate data due to, e.g., maintenance, hardware failures, decommissioning of old hardware, resource balancing, or simply a business decision. Regarding resource balancing, for example, the accounts of a relatively small number of very active users can consume a majority of the data storage resources. If a disproportionate number of such users are serviced by a given data storage node, the servicing of other users whose accounts are also serviced by the data storage node can be impacted, e.g., by reduced response times. In such cases, it may be desirable to relocate the data of some of the very active users to another cluster and/or data storage node to avoid unduly burdening the processing and memory resources of a given cluster and/or storage node.

Data may be relocated between data storage nodes in the same cluster or in different clusters. In the example of FIG. 3, data is relocated from a cluster 300 to a cluster 350. Additionally, a primary copy of the data is stored at a primary source storage node 310, while mirror copies are located at first and second secondary source storage nodes 320 and 330. One or more mirror copies may be maintained. The primary source storage node 310 can obtain internal network addresses of the first and secondary source storage nodes 320 and 330 from the local topology database for communicating with them.

Agents are provided at the data storage nodes to carry out the relocation of the primary copy of the data and the one or more mirror copies in a distributed manner which does not require oversight by the administrator/external software 195. For example, in the cluster 300, agents 312, 322 and 332 are provided for data storage nodes 310, 320 and 330, respectively. In the cluster 350, agents 362, 372 and 382 are provided for data storage nodes 360, 370 and 380, respectively. The agents are lightweight software programs that run in the background to carry out relocation tasks of a relocation service. An agent can be implemented as a Windows service or a Unix daemon process, for instance. Each data storage node primarily contains and manages its storage. The administrator/external software function 195 can provide a request to the primary source storage node 310 to relocate data. For example, a manual request can be provided by a human operator. Or, a request to relocate data can be provided automatically by the external software. The human operator could alternatively be local to the cluster 300, while the external software could be replaced by, or work in conjunction with, software that is local to the cluster 300. In one possible approach, the request is provided using a secure Simple Object Access Protocol (SOAP) interface. SOAP is a lightweight, XML-based protocol for exchanging information in a decentralized, distributed environment. SOAP can be used to query and return information and invoke services across the Internet.

The agent 312 receives the request to relocate data from the administrator/external software 195, for instance, and communicates a corresponding request directly to the agents 322 and 332, respectively, of the first and second secondary source storage nodes 320 and 330. The agent 312 requests that the first secondary source storage node 320 relocate its copy of the data to the first secondary destination storage node 370, and requests that the second secondary source storage node 330 relocate its copy of the data to the second secondary destination storage node 380. Moreover, in response to the received request, the agent 312 begins relocating its associated data to the primary destination storage node 360. Relocation of the primary data and the one or more copies of the secondary data can occur in parallel, at least in part.

The destination storage nodes which are to receive the relocated data can be selected and identified in different ways. In one approach, the administrator/external software 195 selects and identifies the destination storage nodes. In another approach, the agent 312 matches the secondary source storage nodes 320 and 330 with the associated secondary destination storage nodes 370 and 380, respectively. In either case, the agent 312 can issue a relocate request to each of the redundant, or secondary, source nodes at the same time, where the request contains the IP address of the one or more secondary destination nodes to which the data should be relocated. In another possible approach, the agent 312 can interrogate the agent 362 to obtain network addresses of the secondary destination nodes 370 and 380 when the agent 312 cannot access the topology database of the cluster 350. On the other hand, in a scenario where the source and destination storage nodes are in the same cluster, for instance, the agent 312 can obtain the network addresses of the secondary destination nodes 370 and 380 by accessing the local topology database.

A mechanism can be provided for determining which destination storage nodes are available for receiving relocated data. For example, a capacity model may be used to identify data storage nodes that are relatively underutilized. Moreover, it may be sufficient to select only the primary destination storage node when it is already associated with specified secondary destination storage nodes. The source storage nodes can obtain the network addresses of the associated destination storage nodes from the topology database 146. For example, the agent 312 may obtain the network addresses of the storage nodes 370 and 380 and provide them to the agents 322 and 332, respectively. Or, the agents 322 and 332 may access the topology database 146 themselves to obtain the network addresses of the storage nodes 370 and 380.

In one approach, the agent 312 that is running on the primary source storage node 310 is ultimately responsible for the control of the relocation of its own data as well as that of each of the secondary sources 320 and 330, and can report the ultimate success or failure of a relocation operation to the administrator/external software 195. This frees the administrator/external software 195 from the need to oversee the relocation operations. Moreover, relocation of data can occur at different primary source storage nodes within the same or different clusters at the same time. To manage the relocation of the data, the agent 312, which can be considered to be a managing or initiating agent, receives status information from the other agents indicating the status of the respective data relocation operations. For example, the agent 312 may receive status information from the agent 362 indicating whether the primary copy of the data has been successfully received, as well as other information such as the start and stop times of the relocation operation. The status information may also indicate the amount of data received as the relocating progresses. The agent 312 may also receive status information from the agents 322 and/or 372 indicating the status of the data relocation from the first secondary source storage node 320. The agent 312 may further receive status information from the agents 332 and/or 382 indicating the status of the data relocation from the second secondary source storage node 330. Status information may also be provided from the agent 372 to the agent 322, and from the agent 382 to the agent 332. Status information from any of the agents can also be provided to the administrator/external software 195 for logging and for allowing a user to observe the progress of the relocation operations.

The request provided by the agent 312 may include an identifier such as a requester string that is passed with all status messages. The presence of the identifier in the received status messages allows the agent 312 to associate the received status messages with a specific relocation request. This may be useful, for instance, when multiple relocation operations occur simultaneously in a cluster. When used for this purpose, the identifier should be unique for each request. Also, the identifier can indicate that a peer status request notification is being requested. For example, in the requestor string of the following format: "protocol:// host:port", the protocol, e.g., Transmission Control Protocol (TCP), host identifier and port identifier are provided. The host identifier can be, e.g., a full IP address or a host name, while the port identifier can simply be a numerical port identifier. This is essentially a Uniform Resource Identifier (URI) as defined in the related RFC with an empty path. When the requester string follows this format, notification of the relocation success or failure can be made using the protocol, machine, and port identified by the requester string. For example, the request provided by the agent 312 to the agents 322 and 332 may include the requestor string. Moreover, the agents 322 and 332 may communicate the requestor string to the associated agents 372 and 382, respectively. The agent 312 may also communicate the requester string to the associated agent 362.

The status information provided by the agents can be broadcast or multicast using a publish-subscribe system to any process which has registered interest in receiving it. For example, the agents 322, 332, 362, 372 and 382 can publish their relocation status to automatically notify the agent 312, which has registered as a subscriber. The notification may use TCP or the User Datagram Protocol (UDP), for instance. TCP enables two hosts to establish a connection and exchange streams of data, while providing reliable transport, flow control and congestion control. UDP, although not having reliability features built in, should be suitable for use within a controlled network environment. It also has the benefit of supporting multicasting which enables status information to be monitored from any interested machine.

In one approach, components wishing to receive and/or persist status messages regarding the success or failure status of a relocation operation can listen asynchronously on a multicast UDP socket for status messages. In particular, the components can register to receive status messages by knowing the multicast IP address and port number. They then register interest by joining the multicast group and listening for messages. Or, with a requester string having the example format provided above, the status can be sent to the requester directly. The caller can listen using the protocol, host, and port number passed in the requester string. To unregister interest in status messages, a component can drop from the multicast group. Sending a status message can involve connecting to the multicast IP address and port, constructing the status message with a payload which is an XML fragment with the necessary status information, and casting the fragment. The agent 312 can thereby monitor the progress of the relocation operations by obtaining status information from the agents 322, 332, 362, 372 and/or 382. The administrator/external software function 195 can also issue monitoring requests to a specific storage node, such as by using a SOAP interface.

Each agent can communicate in a peer-to-peer manner with other agents, and set up a peer-to-peer data transmission pathway to the agent of a destination storage node. The communication protocol between two agents may provide authentication, such as by using secure Hypertext Transfer Protocol or TCP over Secure Sockets Layer (SSL), such as when agents in two clusters in geographically disperse locations communicate with one another. Once a connection is established between two peer agents, data can be transferred using a streaming protocol over the underlying secure socket connections. Furthermore, each pair of agents, e.g., agent pairs 312 and 362, 322 and 372, and 332 and 382, can negotiate timing, transmission rate and other factors regarding the transferred data to ensure that the transfer does not unduly affect the performance of either storage node. In particular, the agent at the receiving end, e.g., agent 362, 372 or 382, can reply back to the agent at the transmitting end, e.g., agent 312, 322 or 332, with information about its resources so that the sender can throttle the operation accordingly by dynamically adjusting the transmission rate. This control mechanism can be used to guarantee that the performance of the storage node on the receiving side will not be unduly affected by the relocation operation. The same feedback mechanism is also available on the sender side. The agent on the sender side can monitor the same set of critical resources such as network utilization, incoming data request queuing, average retrieval time of I/O operations for external clients, and so forth. Moreover, if the values of these metrics operate for an extended period of time outside the expected limits, the sender can adjust the threshold to ensure that external clients are unaffected by the background relocation operation.

The relocated data, such as data associated with one or more user accounts, is generally not atomic. That is, the data is typically stored in separate files, file systems, database records, or other locations. Moreover, the data may be stored in a compressed form. For instance, for an email application, the body of each email may be stored in a separate file, while information indicating settings and properties associated with the email, such as whether the email has previously been opened, and so forth, are also stored separately. In one approach, relocation of a user's account can be broken up into individual operations, such as for each file, so that a success or failure is declared for each file. In another approach, the entirety of the data which is relocated, such as the data associated with a user's account, is moved atomically. Essentially, the data associated with the account is packaged as a unit and relocated over a single connection so that there is no need to re-establish a connection for communicating different portions of the data. In this manner, success or failure is declared for the operation as a whole. This approach can facilitate moving, cleanup and account verification. A copy of the relocated data can be maintained on the sending storage node until the destination storage node confirms receipt of the data, after which the data can be deleted from the sending storage node and the associated account can be decommissioned. Data from multiple accounts can also be relocated at the same time, in one or more atomic relocation operations. The user associated with an account that is being relocated may be locked out from accessing the account during the relocation.

Figure 4:
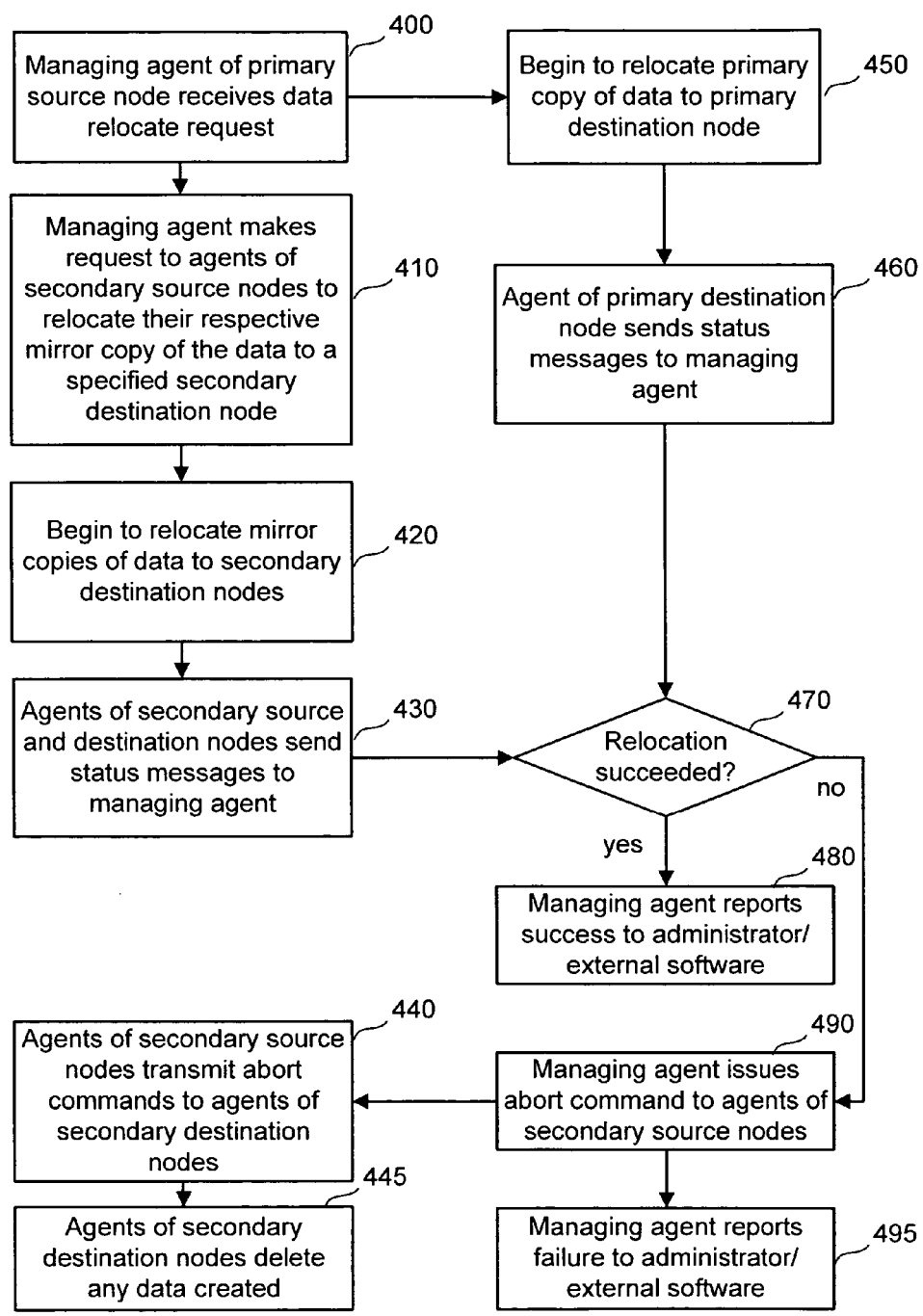
FIG. 4 illustrates a method for relocating a primary copy of data and one or more mirror copies.

FIG. 4 illustrates a method for relocating a primary copy of data and one or more mirror copies. An overview of a method discussed in connection with FIG. 3 is provided. At step 400, the managing agent, which is the agent of the primary source storage node, receives a request to relocate data, such as from an administrator. At step 410, the managing agent makes a request to the agents of the secondary source storage nodes to relocate their respective mirror copy of the data to a specified secondary destination storage node and, at step 420, relocation of the mirror copies begins. At step 430, the agents of the secondary source and destination storage nodes send respective status messages to the managing agent using any of the previously-described mechanisms, for example. Meanwhile, in parallel, at step 450, the managing agent begins to relocate the primary copy of the data to the primary destination storage node. At step 460, an agent of the primary destination storage node sends its status messages to the managing agent.

At decision block 470, a determination is made as to whether the relocation of each copy of the data succeeded. Generally, the managing agent can ascertain from the status messages whether the data relocation operation is successful. In one approach, the relocation is considered to be successful when the primary copy and at least one of the secondary copies of the data is successfully relocated. If one of the secondary copies is successfully relocated but one or more other secondary copies are not successfully relocated, an additional copy of the successfully relocated secondary copy can be made at the receiving side cluster. In this approach, the managing agent will fail the relocation and issue an abort command to each agent associated with the secondary source storage nodes (step 490) if the primary copy is not successfully relocated or if none of the secondary copies of the data is successfully relocated. The agents associated with the secondary source storage nodes can transmit or relay the abort command to the respective agents associated with the secondary destination storage nodes (step 440), which can delete any data they may have already created (step 445). In another approach, the relocation is considered to be successful when the primary copy and all of the secondary copies of the data are successfully relocated. In this approach, the managing agent will fail the relocation and issue an abort command if any of the copies of the data are not successfully relocated. The managing agent can report the success (step 480) or failure (step 495) of the relocation to the administrator.

Figure 5:
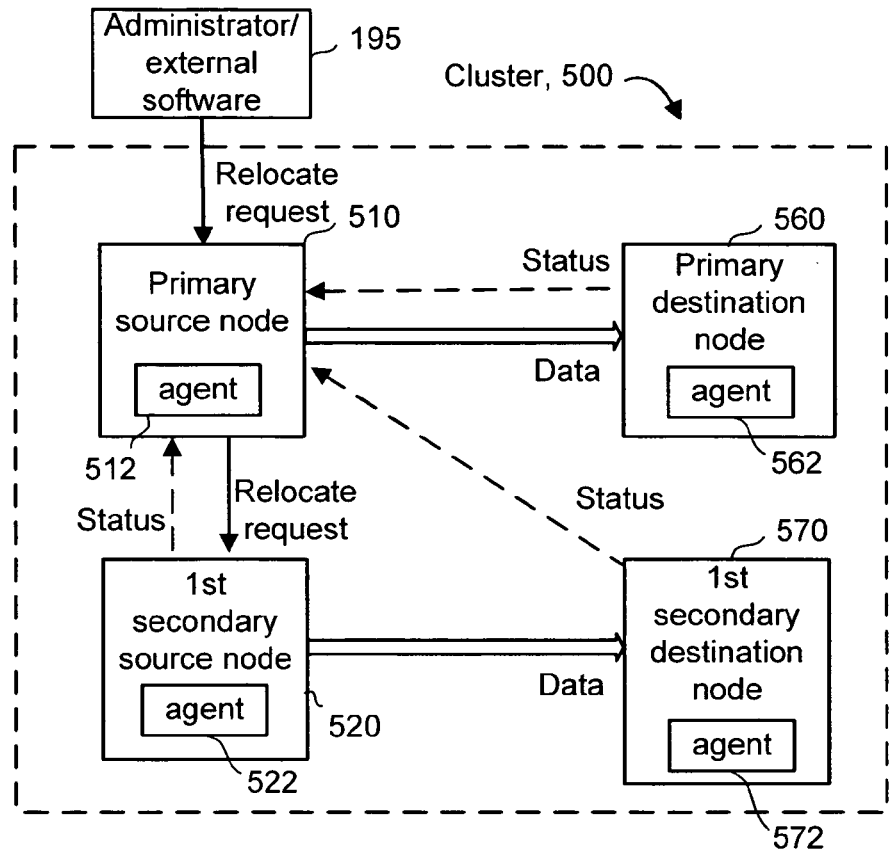
FIG. 5 illustrates relocation of a primary copy of data and one mirror copy between data storage nodes in a cluster.

FIG. 5 illustrates relocation of a primary copy of data and one mirror copy between data storage nodes in a cluster. As mentioned, data relocation can occur within a cluster or between clusters. In the present example, data relocation occurs within a cluster 500. Furthermore, a primary copy of data and one mirror copy of the data are relocated. An administrator/external software function 195 sends a relocate request to an agent 512 of a primary source storage node 510 which, in turn, communicates a relocate request to an agent 522 of a first secondary source storage node 520. The primary copy of the data is relocated from the primary source storage node 510 to a primary destination storage node 560 on which an agent 562 runs, while the mirror copy of the data is relocated from the first secondary source storage node 520 to a first secondary destination storage node 570 on which an agent 572 runs. The agents 522, 562 and 572 may provide status information to the agent 512 to allow the agent 512 to monitor and manage the relocation operations, as discussed previously. Furthermore, the agents 512 and 562, and 522 and 572, may negotiate transfer rates.

Figure 6:
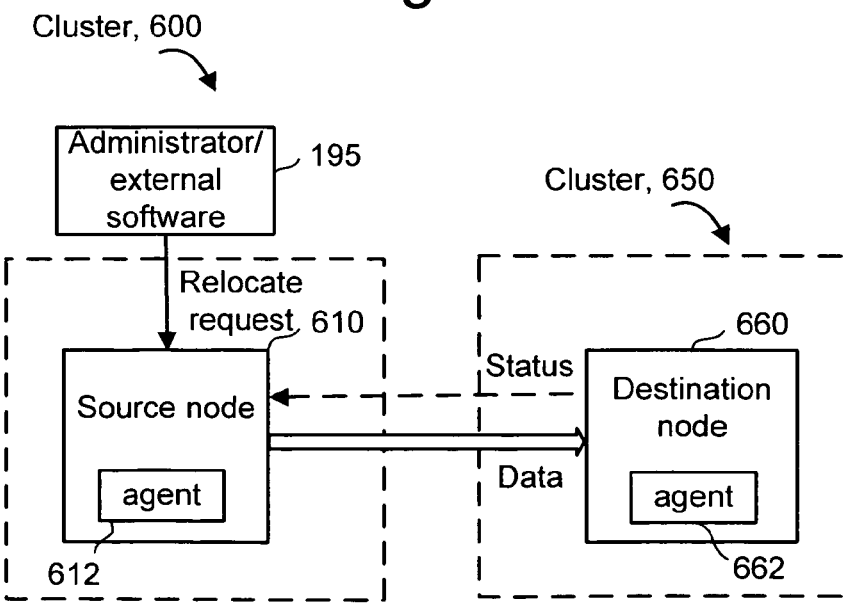
FIG. 6 illustrates relocation of a primary copy of data between data storage nodes in different clusters.

FIG. 6 illustrates relocation of a primary copy of data between data storage nodes in different clusters. In the present example, data relocation occurs between single storage nodes in different clusters 600 and 650. A single copy of data is relocated. An analogous relocation operation may occur between single storage nodes in the same cluster. The administrator/external software function 195 sends a relocate request to an agent 612 of a source storage node 610. In response, the agent 612 initiates relocation of the data from the source storage node 610 to a destination storage node 660 on which an agent 662 runs. The agent 662 may provide status information to the agent 612 to allow the agent 612 to monitor and manage the relocation operation, as discussed previously. Furthermore, the agents 612 and 662 may negotiate transfer rates.

Figure 7:
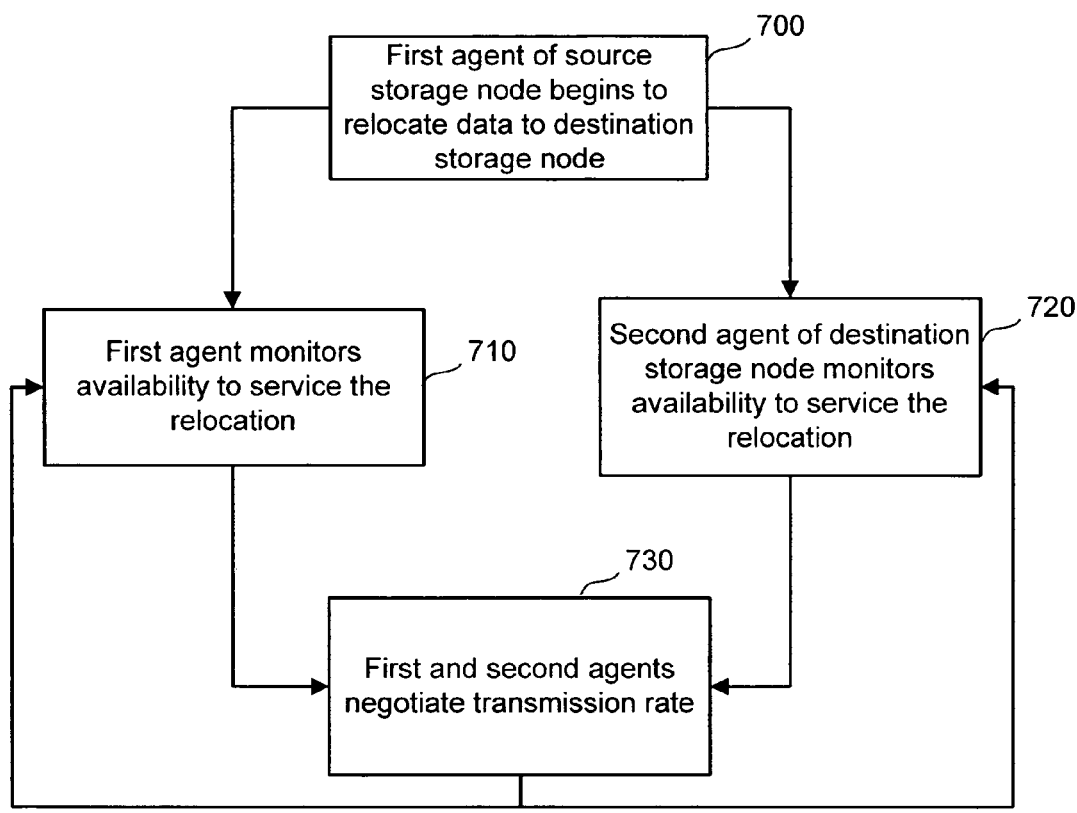
FIG. 7 illustrates a method for controlling a transmission rate for relocating data.

FIG. 7 illustrates a method for controlling a transmission rate for relocating data. As mentioned previously, each pair of agents can negotiate timing, transmission rate and other factors regarding the transferred data to ensure that the transfer does not unduly affect the performance of either storage node or cluster. An overview of an example method is provided. At step 700, the first agent of the source storage node begins to relocate data to the destination storage node, e.g., at some initial transmission rate. At step 710, the first agent monitors its availability to service the relocation, while at step 720, the second agent monitors its availability to service the relocation. For example, this may involve monitoring factors such as network utilization, incoming data request queuing, average retrieval time of I/O operations for external clients, and so forth. At step 730, the first and second agents negotiate a transmission rate based on their respective availabilities. The process may be repeated to adjust the transmission rate based on live feedback of the availability information.

Figure 8:
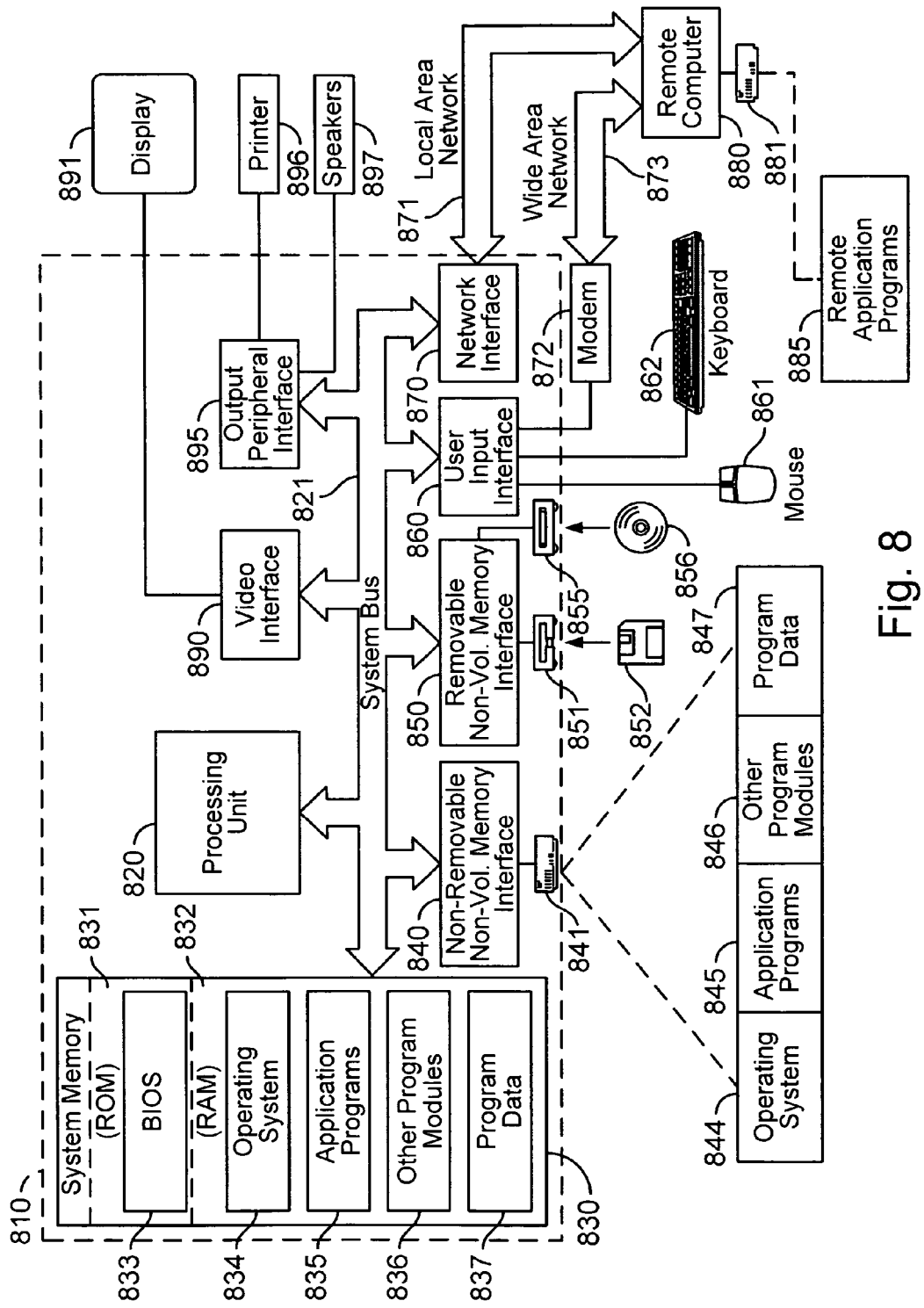
FIG. 8 is a block diagram of computer hardware suitable for implementing embodiments of the invention.

FIG. 8 is a block diagram of computer hardware suitable for implementing embodiments of the invention. An exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. For example, hard disk drive 841 is illustrated as storing operating system 844, application programs 845, other program modules 846, and program data 847. These components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated. The logical connections depicted include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for relocating data, comprising:

using a first agent at a first data storage node, initiating relocation of a first copy of data stored on the first data storage node to a second data storage node, and communicating, to an agent of a third data storage node on which a second copy of the data is stored, a request to initiate relocation of the second copy of the data to a fourth data storage node; and receiving, at the first agent, status information provided by the agent of the third data storage node that indicates a status of the relocation of the second copy of the data to the fourth data storage node, the status information indicates whether the relocation of the second copy of the data to the fourth data storage node has been successfully completed.

2. The computer-implemented method of claim 1, further comprising:

receiving, at the first agent, status information provided by an agent of the fourth data storage node that indicates a status of the relocation of the second copy of the data to the fourth data storage node.

3. The computer-implemented method of claim 1, wherein:

the request communicated to the agent of the third data storage node includes an identifier;

the agent of the third data storage node includes the identifier in the status information; and the first agent uses the identifier in the status information to associate the status information with the request when multiple relocation operations occur simultaneously.

4. The computer-implemented method of claim 1, wherein:

the request identifies a protocol to be used in communicating the status information to the first data storage node.

5. The computer-implemented method of claim 1, wherein:

the request identifies the first data storage node as a machine to which the status information should be directed.

6. The computer-implemented method of claim 1, wherein:

the request identifies a port of the first data storage node as a port of a machine to which the status information should be directed.

7. The computer-implemented method of claim 1, wherein:

the first agent receives the status information via a publish-subscribe technique in which the agent of the third data storage node is a publisher and the first agent is a subscriber.

8. The computer-implemented method of claim 1, wherein:

the first and third data storage nodes are co-located in a first cluster; and the second and fourth data storage nodes are co-located in a second cluster which is geographically remote from the first cluster.

9. The computer-implemented method of claim 1, wherein:

the agent of the first data storage node communicates a network address of the fourth data storage node to the agent of the third data storage node for the initiating of the relocation of the second copy of data to the fourth data storage node.

10. The computer-implemented method of claim 1, wherein:
the status information indicates an amount of data received by the fourth data storage node as relocation of the second copy of the data to the fourth data storage node progresses.

11. The computer-implemented method of claim 1, wherein:
the first copy of data stored on the first data storage node is deleted when it is confirmed that the first copy of data has been received at the second data storage node, and the second copy of data stored on the third data storage node is deleted when it is confirmed that the second copy of data has been received at the fourth data storage node.

12. The computer-implemented method of claim 1, wherein:
the first agent issues an abort command to the agent of the third data storage node when the status information indicates that the second copy of the data has not been successfully relocated to the fourth data storage node, and the agent of the third data storage node provides the abort command to the agent of the fourth data storage node, in response to which the agent of the fourth data storage node deletes any data already created at the fourth data storage node from the relocation of the second copy of the data.

13. The computer-implemented method of claim 1, wherein:
the status information indicates start and stop times of the relocation of the second copy of the data to the fourth data storage node.

14. A computer-implemented method for relocating data, comprising:
providing respective agents at respective data storage nodes, including first and second storage nodes, the respective agent of the first data storage node accessing topology information to obtain a network address of the second data storage node and establish a data transmission path between the first and second data storage nodes using the network address; and
relocating data at the first data storage node to the second data storage node via the established transmission path, the respective agent of the first data storage node managing the relocating.

15. The computer-implemented method of claim 14, wherein:
the respective agents of the first and second data storage nodes repeatedly monitor their respective availabilities for servicing the relocating and, in response, repeatedly negotiate a data transfer rate of the relocating.

16. The computer-implemented method of claim 14, wherein:
the data comprises a plurality of data files associated with a user account that are relocated from the first data storage node to the second data storage node as a unit via a single connection there between, the user account is decommissioned from the first data storage node when the second data storage node confirms receipt of the data.

17. The computer-implemented method of claim 14, wherein:
the first and second data storage nodes are in different geographically remote clusters of a data center.

18. Computer readable storage media having computer readable code embodied thereon for programming at least one processor to perform a method for relocating data, the method comprising:
providing respective agents at respective data storage nodes, including a first data storage node, a second data storage node for receiving relocated data from the first data storage node, a third data storage node that stores mirror data of the first data storage node, and a fourth data storage node for receiving relocated data from the third data storage node, the respective agent of the first data storage node initiating transfer of the data thereat to the second data storage node, and communicating to a respective agent of the third data storage node, a request to initiate relocation of the mirror data to the fourth data storage node; and
monitoring, at the respective agent of the first data storage node, the relocating of the data from the first data storage node to the second data storage node, and the relocating of the mirror data from the third data storage node to the fourth data storage node.

19. The computer readable storage media of claim 18, wherein:
the monitoring comprises receiving, at the respective agent of the first data storage node, status information provided by the respective agents of the second, third and fourth data storage nodes.

20. The computer readable storage media of claim 19, wherein the method performed further comprises:
communicating an identifier to the second, third and fourth data storage nodes;
wherein the status information provided by the second, third and fourth data storage nodes includes the identifier; and
the first agent uses the identifier in the received status information to identify the received status information.

* * * * *